(12) United States Patent
Kade et al.

(10) Patent No.: US 7,068,155 B2
(45) Date of Patent: Jun. 27, 2006

(54) APPARATUS AND METHODS FOR NEAR OBJECT DETECTION

(75) Inventors: Alexander Kade, Grosse Pointe Woods, MI (US); William J. Chundrlik, Jr., Rochester Hills, MI (US); Richard K. Deering, Clinton Township, MI (US); Osman D. Altan, Northville, MI (US)

(73) Assignee: General Motors Corporation, Detroit, MI (US)

( * ) Notice: Subject to any disclaimer, the term of this patent is extended or adjusted under 35 U.S.C. 154(b) by 166 days.

(21) Appl. No.: 10/891,303

(22) Filed: Jul. 14, 2004

(65) Prior Publication Data

US 2006/0012467 A1    Jan. 19, 2006

(51) Int. Cl.
*B60Q 1/00* (2006.01)

(52) U.S. Cl. .................. 340/436; 340/901; 340/904; 340/435; 701/300; 701/70; 701/23; 342/46; 342/47

(58) Field of Classification Search ............ 340/436, 340/425.5, 901–904, 435; 701/23, 24, 70, 701/96, 301; 342/46, 47, 70
See application file for complete search history.

(56) References Cited

U.S. PATENT DOCUMENTS

| 4,530,056 | A  | * | 7/1985 | MacKinnon et al. | 701/25 |
| 5,938,707 | A  | * | 8/1999 | Uehara | 701/41 |
| 6,150,932 | A  | * | 11/2000 | Kenue | 340/435 |
| 6,466,863 | B1 | * | 10/2002 | Shirai et al. | 701/200 |
| 6,593,873 | B1 | * | 7/2003 | Samukawa et al. | 342/70 |
| 6,763,318 | B1 | * | 7/2004 | Winter et al. | 702/158 |

* cited by examiner

*Primary Examiner*—Jeffery Hofsass
*Assistant Examiner*—Daniel Previl
(74) *Attorney, Agent, or Firm*—Laura C. Hargitt

(57) ABSTRACT

Methods and apparatus are provided for detecting an object in the projected path of a vehicle. The apparatus comprises a yaw sensor configured to determine the yaw of the vehicle and an object detection sensor configured to evaluate an Actual Range Bin and to produce obstruction data if an object is sensed within the Actual Range Bin. The apparatus also comprises a controller that is configured to receive the yaw determined by the yaw sensor and determine a projected path of the vehicle based at least in part upon the yaw. The controller is also configured to determine a True Range Bin based at least in part upon the projected path of the vehicle and the Actual Range Bin. The controller is further configured to receive the obstruction data from the object detection sensor and determine if the object is within the True Range Bin.

20 Claims, 3 Drawing Sheets

APPARATUS AND METHODS FOR NEAR OBJECT DETECTION

FIELD OF THE INVENTION

The present invention generally relates to control of automobile movement, and more particularly relates to an apparatus and methods for detecting an object in the projected path of a vehicle.

BACKGROUND OF THE INVENTION

Methods and apparatus are continually sought to assist operator control of automobile movement. Especially desirable are methods and apparatus that assist an operator in detecting when an object lies in the projected path of a vehicle, such as an automobile, a forklift, a golf cart, construction equipment and the like.

When a vehicle is initially put in motion, the operator generally intends to move the vehicle straight forward or backward or intends to steer the vehicle at a forward or backward angle. Thus, the vehicle may have one of a variety of projected paths. As may occur frequently, an object that lies within close proximity of the vehicle may lie in the projected path of the vehicle. If the object is not within the view of the operator, i.e, the object is in a "blind spot" or is too short to be viewable by the operator, as the vehicle follows its projected path, it may hit the object, even though the vehicle was moving slow enough that motion of the vehicle could have been halted had an advanced warning of the object's presence been provided.

Accordingly, it is desirable to provide an apparatus for detecting an object in the projected path of a vehicle. In addition, it is desirable to provide a method for detecting an object in the projected path of a vehicle. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to an exemplary embodiment of the invention, there is provided an apparatus for detecting an object in the projected path of a vehicle. The apparatus comprises a yaw sensor configured to determine the yaw of the vehicle and an object detection sensor configured to evaluate an Actual Range Bin and to produce obstruction data if the object is sensed within the Actual Range Bin. The apparatus also comprises a controller that is configured to receive the yaw determined by the yaw sensor and determine a projected path of the vehicle based at least in part upon the yaw. The controller is also configured to determine a True Range Bin based at least in part upon the projected path of the vehicle and the Actual Range Bin. The controller is further configured to receive the obstruction data from the object detection sensor and determine if the object is within the True Range Bin.

According to another exemplary embodiment of the invention, a method is provided for detecting an object in the projected path of a vehicle. The method comprises the steps of determining the yaw of a vehicle and determining a projected path of the vehicle based at least in part on the yaw of the vehicle. An Actual Range Bin located proximate to the vehicle is established and a True Range Bin based at least in part upon the projected path of the vehicle and the Actual Range Bin is determined. The method further includes evaluating whether the object is within the True Range Bin.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
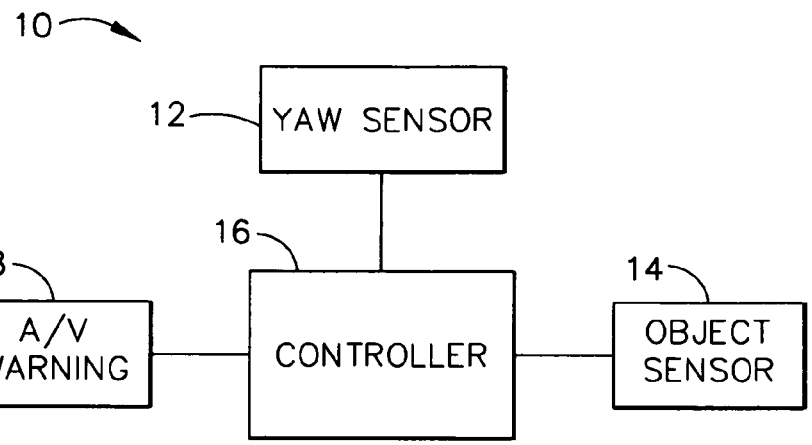
FIG. 1 is a simplified illustration of an apparatus for detecting an object in the projected path of a vehicle according to an exemplary embodiment of the present invention.

Referring to FIG. 1, a simplified schematic is illustrated of an apparatus 10 for detecting one or more objects in the projected path of a vehicle (not shown) in accordance with an exemplary embodiment of the present invention. Preferably, the vehicle is an automobile; however, it will be appreciated that the vehicle may be any suitable vehicle, such as, for example, a truck, a golf cart, a fork lift, and the like. Generally, the apparatus 10 comprises a yaw sensor 12 that is configured to determine the yaw of the vehicle. As used herein, the term "yaw" has its ordinary meaning and means the angle of deviation from a reference axis of the vehicle. In addition, apparatus 10 comprises at least one object sensor 14 that is configured to detect an object in an Actual Range Bin, described in more detail below, and to produce obstruction data if an object is detected in an Actual Range Bin. Apparatus 10 also comprises a controller 16 that is configured receive the yaw determined by the yaw sensor and determine a projected path of the vehicle based at least in part upon the yaw. Controller 16 is also configured to determine a True Range Bin, described in more detail below, based at least in part upon the projected path of the vehicle and the Actual Range Bin evaluated by the object sensor. Controller 16 is further configured to receive the obstruction data from the object detection sensor and determine if the object is within the True Range Bin. Controller 16 may cause an audio and/or visual (A/V) warning to be generated if the object is within the True Range Bin.

The yaw sensor 12 can have any number of configurations and utilize any number of techniques to determine the yaw of a vehicle. In one exemplary embodiment, yaw sensor 12 can be a steering wheel sensor that is configured to measure the angle of rotation of the steering wheel about the steering wheel column. In another exemplary embodiment, yaw sensor 12 may be a yaw rate sensor, which measures the rotational speed or angular rate of the sensor about an axis perpendicular to the movement of the sensor. In a further exemplary embodiment, yaw sensor 12 can be configured to measure the side-to-side rotation of the wheels of the vehicle about the front and/or back axle of the vehicle. In yet another exemplary embodiment, yaw sensor 12 may comprise any suitable combination of these sensors. In a further exemplary embodiment, if the vehicle is steered by a joystick-type of control, yaw sensor 12 may be compatible with the joystick to measure the yaw of the vehicle. It will be appreciated that yaw sensor 12 can assume any other number of other suitable configurations for measuring the yaw of a vehicle.

Figure 2:
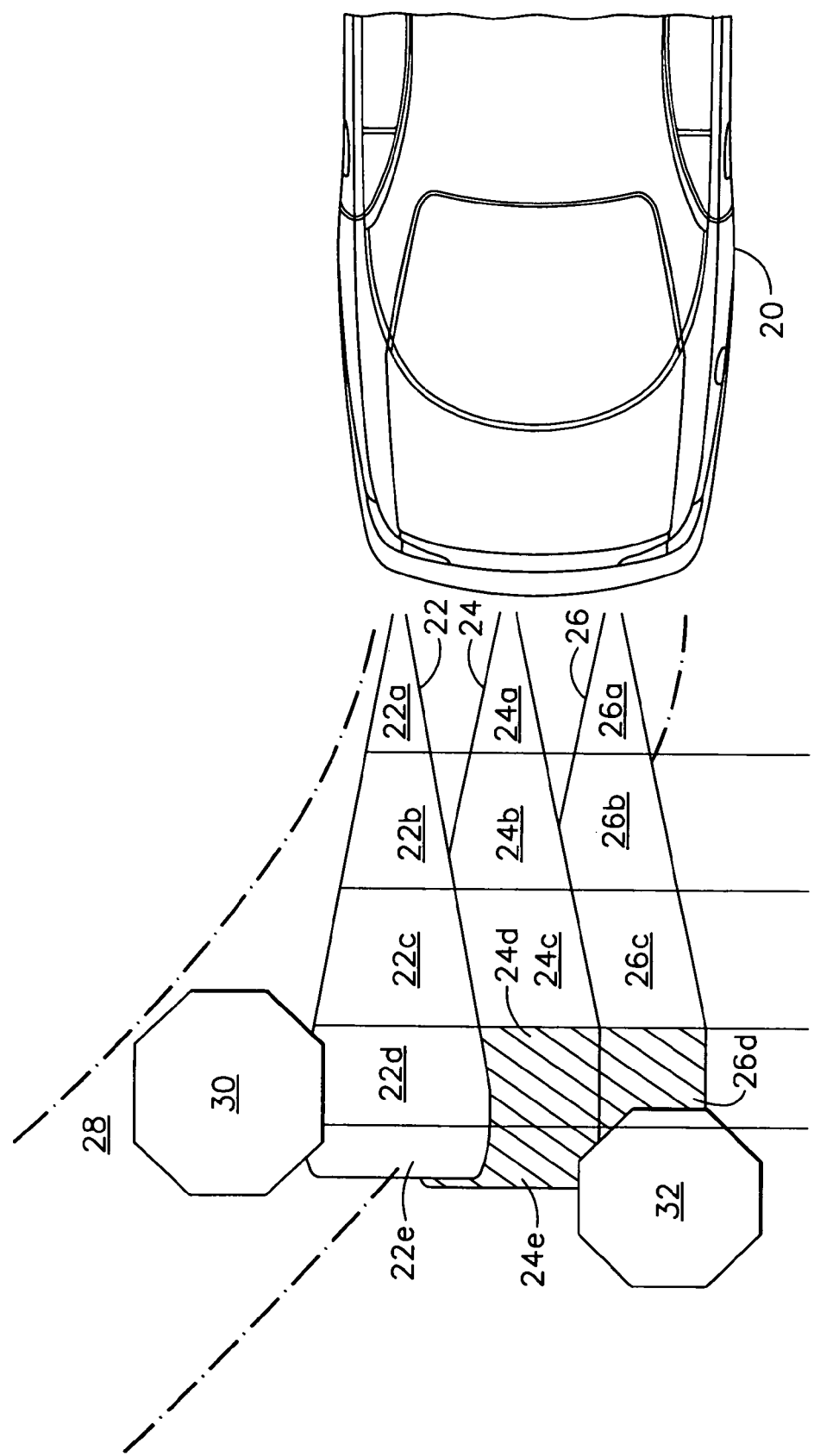
FIG. 2 is a representation illustrating the projected path of a vehicle, Actual Range Bins from three (3) object sensors, and True Range Bins.

Object sensor 14 also can have any number of configurations and utilize any number of techniques to evaluate an Actual Range Bin located proximate to the vehicle and to produce obstruction data if an object is sensed within the Actual Range Bin. Referring momentarily to FIG. 2, a vehicle 20 having three (3) object sensors is illustrated. While the object sensors themselves are not shown, the areas proximate the vehicle that each sensor evaluates or scans are illustrated. For example, a first object sensor may evaluate an area 22 behind the left rear of a vehicle, a second object sensor may evaluate an area 24 behind the center rear of a vehicle, and a third object sensor may evaluate an area 26 behind the right rear of a vehicle. It will be appreciated that the object sensor can also be positioned on a vehicle to measure areas in front of a vehicle. The areas 22, 24 and 26 are divided into sections or portions called "Actual Range Bins." For purposes of illustration, each of the areas 22, 24, and 26 are divided into five Actual Range Bins, 22a–e, 24a–e, and 26a–e, respectively, although each object sensor may be programmed to divide the area that it evaluates or scans into any number of Actual Range Bins having any suitable width and length and arranged in any suitable configuration, with the accuracy of apparatus 10 increasing with the number of Actual Range Bins increasing. To scan the Actual Range Bins, the object sensors may comprise any suitable sensor, such as, for example, an ultra-sonic transponder, a microwave transponder, a laser transponder, a radio frequency transponder and the like. The object sensors may also comprise vision/camera sensors that combine a television or digital camera with vision processing hardware and/or software to detect objects in the field of view of the camera as well as determine the distance of the object and its closing rate. In another embodiment of the invention, the object sensor may comprise any combination of these sensors. While vehicle 20 is illustrated using three object sensors, vehicle 20 may use any suitable number of object sensors with each object sensor scanning any suitable area.

Referring again to FIG. 1, the yaw and obstruction data is received by controller 16 so that the controller can determine if an object is within a True Range Bin. Controller 16 can be a single processing unit or multiple processing units having one or more memories. The one or more memories of controller 16 can be configured to store data and executable instructions for causing a warning to be generated if an object is within a True Range Bin.

If an object is within a True Range Bin, any number of warnings can be generated to alert a driver of the vehicle that an object lies within the projected path of the vehicle. In one exemplary embodiment, apparatus 10 may comprise a warning device 18 that may be activated by controller 16 if controller 16 determines that an object is within a True Range Bin. Warning device 18 may comprise any suitable audio or visual device, such as an LED light, a flashing LED light, a horn, a beeper, a chime, and the like. In a preferred embodiment of the invention, apparatus 10 comprises a combination of audio and visual warning devices. For example, controller 16 may cause an LED on a vehicle dashboard to illuminate when an object is first detected in a True Range Bin, then may cause the LED to flash when the vehicle gets closer to the object, and then may activate a chime when the vehicle gets even closer to the object. In another embodiment of the invention, controller 16 may be configured to activate the brakes of the vehicle so that the vehicle avoids hitting the object.

Figure 3:
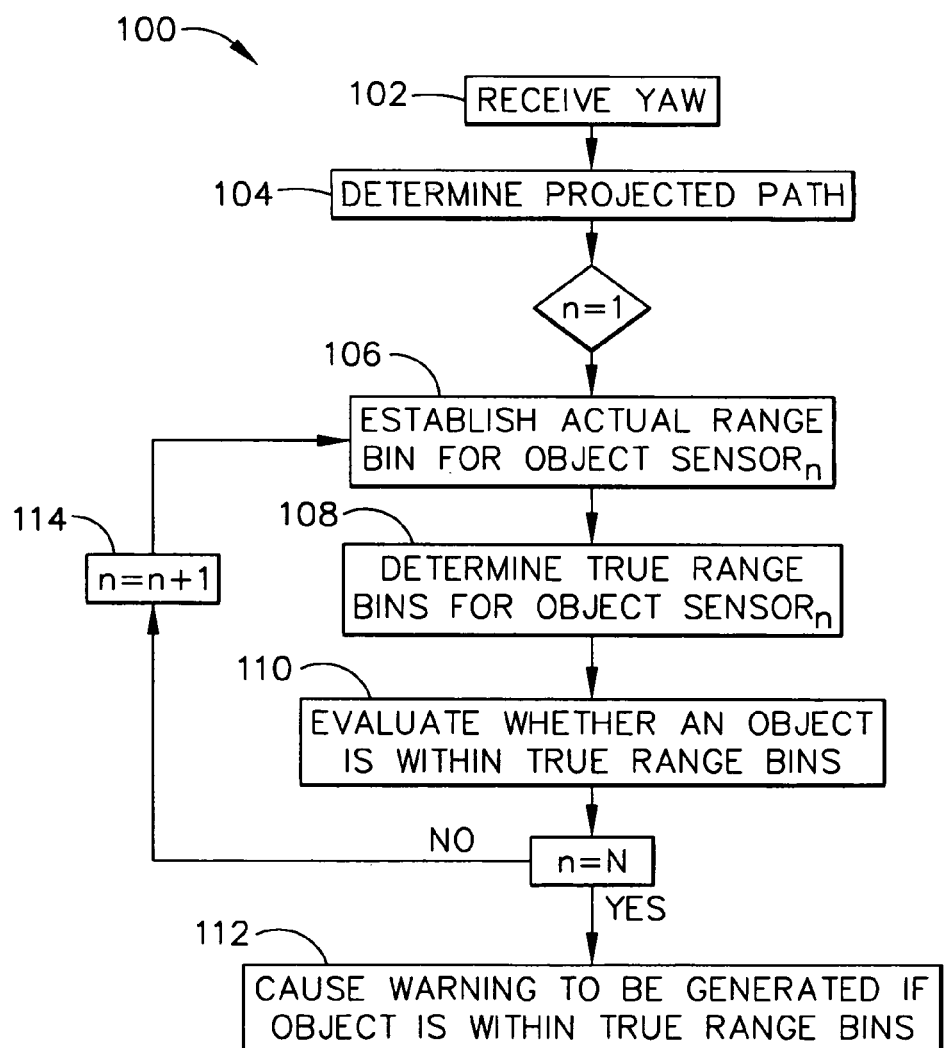
FIG. 3 is a flow chart illustrating a method for detecting objects in the projected path of a vehicle according to an exemplary embodiment of the present invention.

Continuing to refer to FIG. 1 and with additional reference to FIGS. 2 and 3, a method 100 is illustrated in accordance with an exemplary embodiment of the present invention. The method 100 can be executed by the controller 16 to detect an object in the projected path of a vehicle. The method 100 comprises receiving the yaw of the vehicle, step 102, and continues with determining the projected path 28 of the vehicle based at least in part on the yaw of the vehicle, step 104. The equations for calculating the projected path 28 of a particular vehicle will depend on a number of variables, including, but not limited to, the vehicle's track width, the vehicle's steering ratio if the yaw sensor is a steering wheel sensor, the vehicle's turning radius if the yaw sensor is an axle sensor, and other variables related to the vehicle's geometry. Generally, the vehicle's projected path is proportional to the equation:

$$\text{Projected Path} \approx k_\theta \Theta s,$$

where $\Theta s$ is the yaw of the vehicle, such as the steering wheel angle if yaw sensor 12 is a steering wheel sensor, and $k_\theta$ is a vehicle-dependent scaling constant.

Method 100 further comprises establishing Actual Range Bins of an area in front of or behind the vehicle for the object sensor 14 or if the vehicle has more than one object sensor, then the first object sensor 14 (Object Sensor$_n$, where n=1), step 106. Generally, object sensor 14 is configured to transmit a signal from the sensor either directly in front of or directly behind the vehicle, the area of the signal typically having an approximate cone shape. As described above, object sensor 14 may be configured to divide the area that it evaluates or scans into any number of Actual Range Bins arranged in any configuration, typically in series. Data regarding the Actual Range Bins, that is, the position relative to the vehicle and/or object sensor and area of the Actual Range Bins, are transmitted from the object sensor 14 to controller 16 where it is stored. An object in an Actual Range Bin will reflect the signal transmitted by object sensor 14 back to the object sensor 14. When object sensor 14 detects a reflected signal, it sends an obstruction data signal to controller 16.

Figure 4:
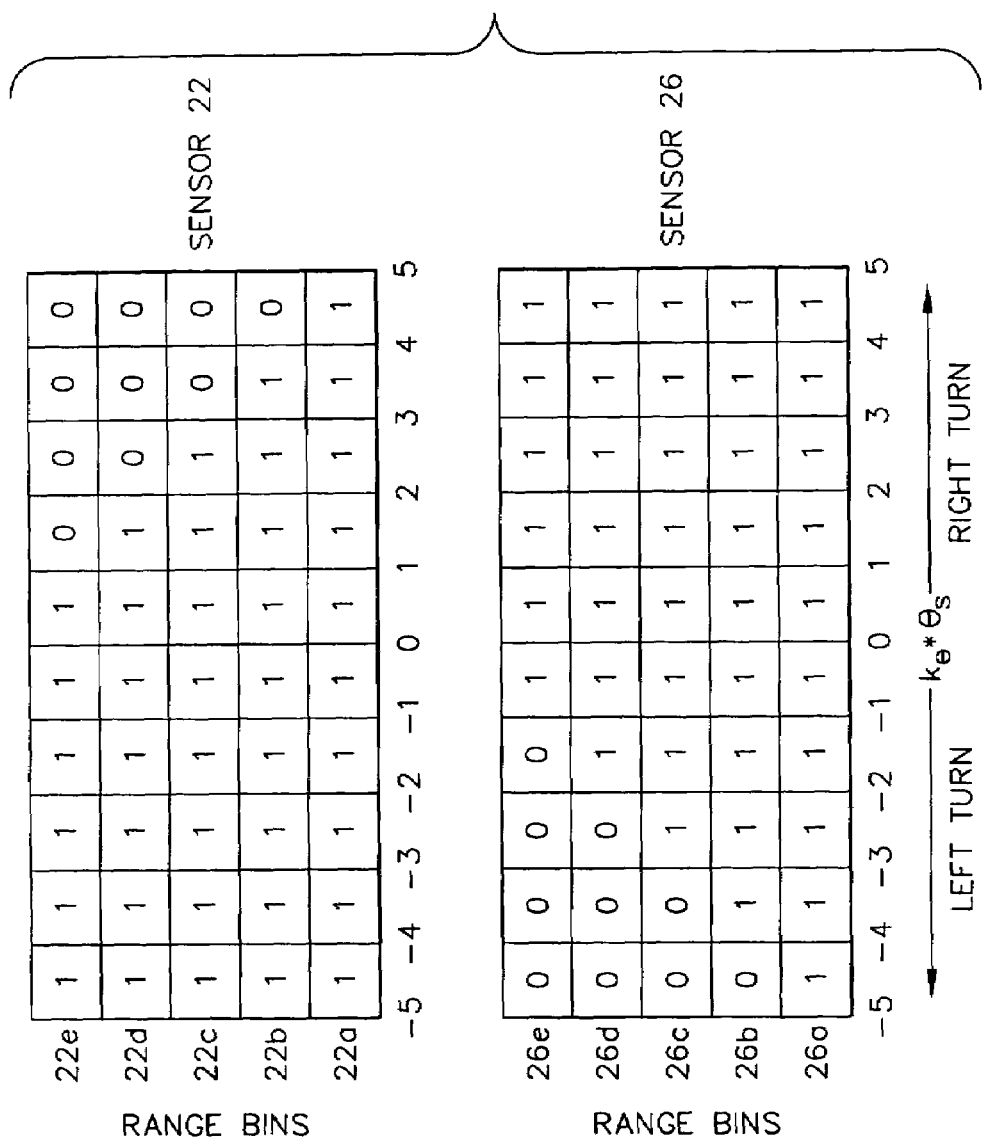
FIG. 4 is a set of representative look-up tables that may be used to determine True Range Bins in accordance with an exemplary embodiment of the present invention.

Once the Actual Range Bins of an object sensor 14 have been established, method 100 comprises determining whether an Actual Range Bin is a "True Range Bin," step 108. A True Range Bin is an Actual Range Bin 22a–e, 24a–e, 26a–e any portion of which overlies the projected path 28 of the vehicle. To determine whether an Actual Range Bin overlies the projected path 28, controller 16 could calculate a series of equations to determine if the areas of the Actual Range Bin and the projected path overlap. The equations would be specific to the vehicle geometries and sensors utilized. Alternatively, controller 16 could store and utilize look-up tables that would facilitate determination of True Range Bins. Referring momentarily to FIG. 4, two representative look-up tables for rear object sensor 22 and rear object sensor 26 for use in an exemplary embodiment of the present invention is illustrated where the yaw sensor is a steering wheel sensor. The x-axis is the value of the project path represented by $k_\theta \Theta s$ where $\Theta s$ is the angle of rotation of the steering wheel of the vehicle. The y-axis is the area of the Actual Range Bins, 22*a–e* and 26*a–e*. A True Range Bin is designated by a "1" and a false range bin, that is, an Actual Range Bin a portion of which does not overlap the vehicles project path, is designated by a "0". Thus, according to these particular look-up tables, regardless of the sharpness of the turn of the steering wheel, the first Actual Range Bins 22*a*, 26*a* are True Range Bins. However, for left turns of the steering wheel of the vehicle as the vehicle is moving backward, Actual Range Bin 26*e* of object sensor 26 is unlikely to be a True Range Bin, whereas for right turns of the steering wheel of the vehicle as the vehicle is moving backward, Actual Range Bin 22*e* of object sensor 22 is unlikely to be a True Range Bin. Referring back to FIGS. 1, 2 and 3, Actual Range Bins 22*a–e*, 24*a–c*, and 26*a–c* are True Range Bins because they overlap projected path 28. Actual Range Bins 24*d*, 24*e*, 26*d* and 26*e*, shown in cross-hatch configuration, are false range bins, as they do not overlap projected path 28.

Once the True Range Bins for an object sensor 14 (Object Sensor$_n$) have been determined, the controller 16 then evaluates whether an object 30, 32 is within one of the True Range Bins, step 110. As described above, when an object in an Actual Range Bin reflects a signal transmitted by the object sensor 14, object sensor 14 detects the reflected signal and sends an obstruction data signal to controller 16. Controller 16 utilizes the obstruction data signal to determine if the object is disposed within an Actual Range Bin that is a True Range Bin.

If the object is disposed within a True Range Bin, in one exemplary embodiment of the invention, controller 16 may then cause a warning to be generated to driver so that motion of the vehicle can be terminated. Alternatively, controller 16 may be configured to terminate motion of the vehicle itself. In another exemplary embodiment of the invention, controller 16 may than proceed to the next object sensor 14 if there are more than one object sensors 14 (i.e., if n≠N where N equals the total number of object sensors, then n=n+1). After all object sensors 14 have been evaluated to determine the True Range Bins and all True Range Bins have been evaluated to determine if any objects lie within, if an object is within any such True Range Bin, then controller 16 may cause a warning to be generated or otherwise may terminate motion of the vehicle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An apparatus for detecting an object in the projected path of a vehicle, the apparatus comprising:
   a yaw sensor configured to determine a yaw of the vehicle;
   an object detection sensor configured to evaluate an Actual Range Bin and to produce obstruction data if an object is detected within said Actual Range Bin;
   a controller that is configured to:
   receive said yaw determined by said yaw sensor and determine a projected path of the vehicle based at least in part upon said yaw;
   determine a True Range Bin based at least in part upon said projected path of the vehicle and said Actual Range Bin; and
   receive said obstruction data from said object detection sensor and determine if said object is within said True Range Bin.

2. The apparatus of claim 1, said controller further configured to cause a warning to be generated if said object is within said True Range Bin.

3. The apparatus of claim 2, wherein said apparatus further comprises a warning device that is activated by said controller if said object is within said True Range Bin.

4. The apparatus of claim 3, wherein said warning device comprises at least one of an audio and visual device.

5. The apparatus of claim 4, wherein said warning device comprises at least one of a light, a horn, a beeper and a chime.

6. The apparatus of claim 1, the yaw sensor comprising a steering wheel angle sensor.

7. The apparatus of claim 1, wherein said object detection sensor is configured to evaluate an area proximate the vehicle, said Actual Range Bin comprising a portion of said area.

8. The apparatus of claim 7, said area comprising a plurality of Actual Range Bins.

9. The apparatus of claim 1, wherein said controller is configured to activate the braking mechanism of the vehicle if said object is within said True Range Bin.

10. The apparatus of claim 1, said vehicle comprising an automobile.

11. A method for detecting an object in the projected path of a vehicle, the method comprising the steps of:
    determining the yaw of a vehicle;
    determining a projected path of the vehicle based at least in part on said yaw of the vehicle;
    establishing an Actual Range Bin located proximate to the vehicle;
    determining a True Range Bin based at least in part upon said projected path of the vehicle and said Actual Range Bin; and
    evaluating whether the object is within said True Range Bin.

12. The method of claim 11, further comprising causing a warning to be generated if said object is within said True Range Bin.

13. The method of claim 12, wherein said step of causing a warning to be generated comprises activating a warning device.

14. The method of claim 13, wherein said step of causing a warning to be generated comprises generating a first warning when the vehicle is a first distance from said object and generating a second warning when the vehicle is a second distance from said object.

15. The method of claim 11, wherein said step of determining a projected path comprises determining said projected path based in part on the equation $k_\theta \Theta s$ where $\Theta s$ is the yaw of the vehicle and $k_\theta$ is a vehicle-dependent scaling constant.

16. The method of claim 11, wherein said step of establishing an Actual Range Bin comprises storing an area and position of an Actual Range Bin in a memory.

17. The method of claim 11, wherein said step of establishing an Actual Range Bin comprises receiving data from an object sensor configured to evaluate an area proximate the vehicle, a portion of said area comprising an Actual Range Bin.

18. The method of claim 11, wherein said step of determining a True Range Bin comprises determining said True Range Bin from a look-up table.

19. The method of claim 11, wherein said step of evaluating whether an object is within said True Range Bin comprises receiving from an object sensor obstruction data that indicates whether an object is within an Actual Range Bin that is a True Range Bin.

20. The method of claim 11, further comprising activating the vehicle's braking mechanism if said object is within said True Range Bin.

* * * * *